May 3, 1966     D. G. DOWNES     3,248,922
LINKAGE MEANS
Filed Aug. 29, 1963     2 Sheets-Sheet 1
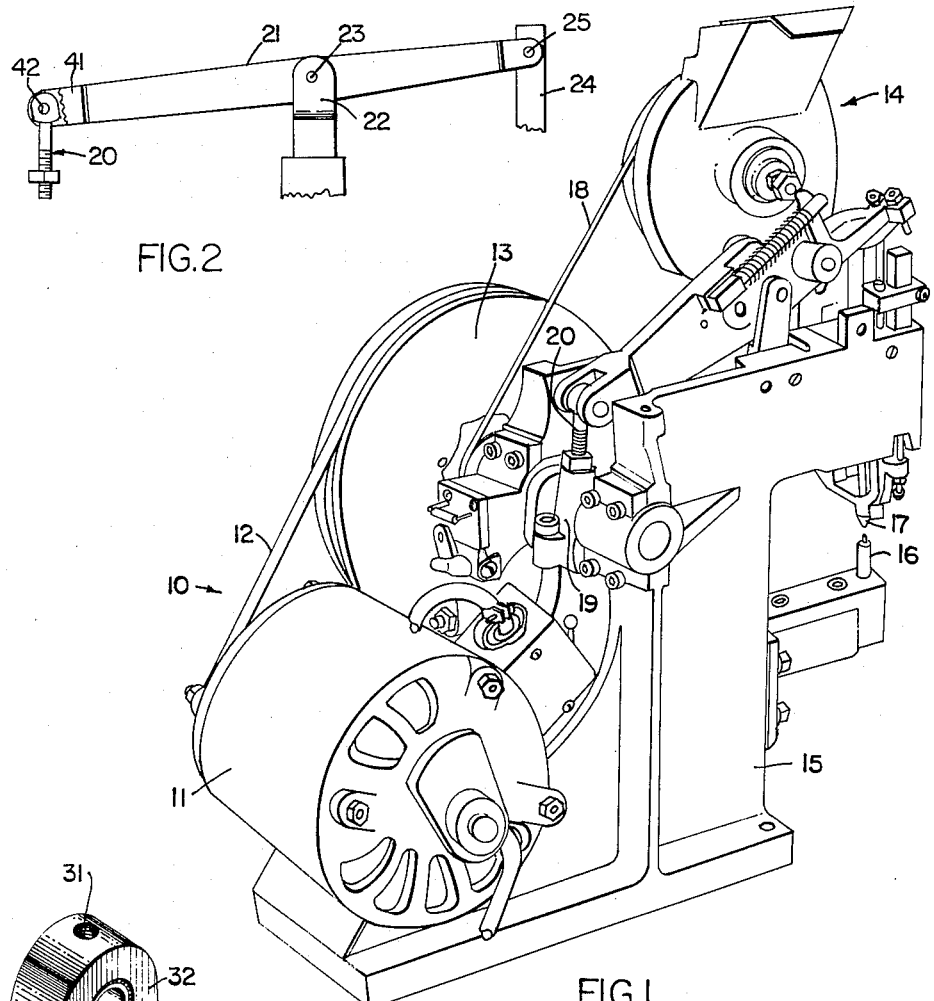
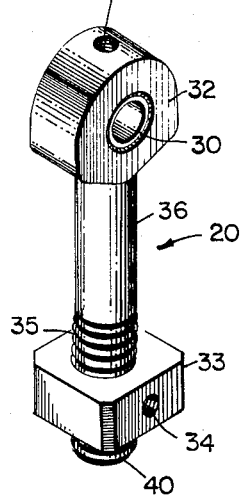
INVENTOR.
DOUGLAS G. DOWNES
BY Ezekiel Wolf, Wolf & Greenfield
ATTORNEYS May 3, 1966   D. G. DOWNES   3,248,922
LINKAGE MEANS
Filed Aug. 29, 1963   2 Sheets-Sheet 2
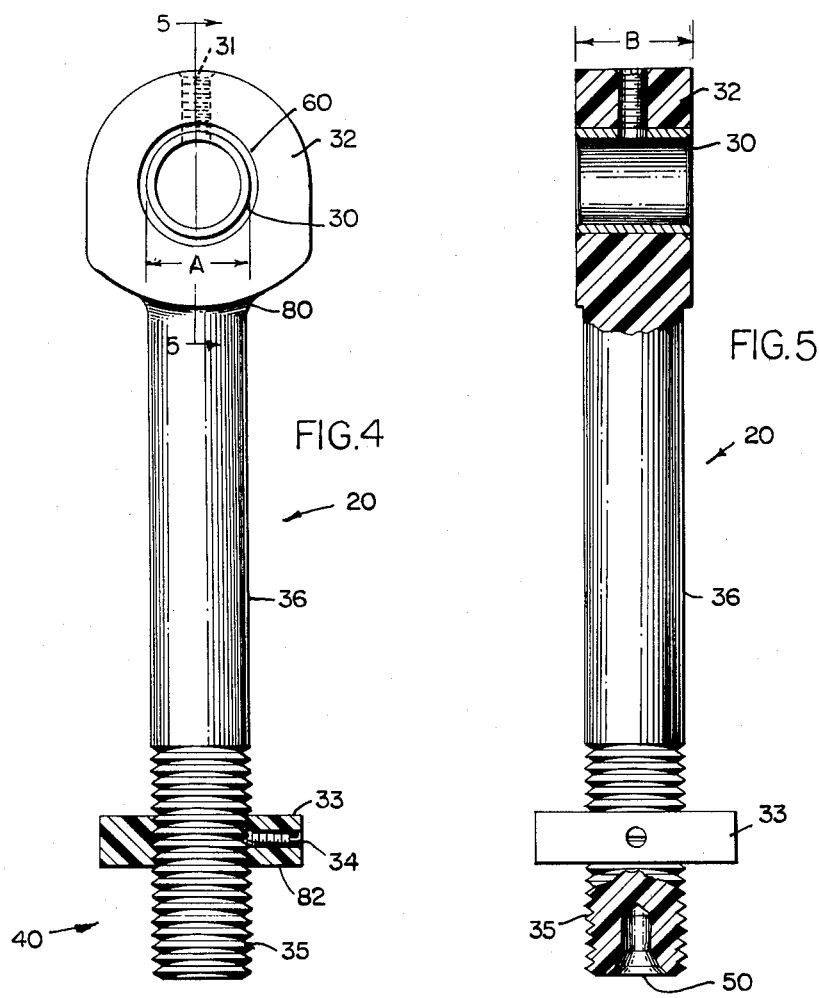
INVENTOR.
DOUGLAS G. DOWNES
BY
Ezekiel Wolf, Wolf & Greenfield
ATTORNEYS

United States Patent Office 3,248,922
Patented May 3, 1966

3,248,922
LINKAGE MEANS
Douglas G. Downes, Sawyer Road, Natick, Mass.
Filed Aug. 29, 1963, Ser. No. 305,309
4 Claims. (Cl. 72—431)

This invention relates generally to linkage members and more particularly to a resiliently compressible plastic linkage member particularly useful in conjunction with a lever arm for transmitting forces applied to the linkage member over selected distances.

The linkage member of this invention is advantageously employed in conventional riveting machines for clinching rivets on a work piece. Such machines often include a lever arm pivotally supported at an intermediate fulcrum point, and a hammer pivotally mounted at one end of the lever for engaging and applying pressure to a rivet to clinch it to a work piece when the lever is pivoted about the fulcrum in a first direction. A power source is linked to the other or second end of said lever for moving the lever in the first direction and for applying pressure through the lever to the rivet. A linkage member may pivotally couple the second end to the power source for transmitting axially applied forces to the other end.

The clinching force necessary to clinch similar rivets to work pieces may vary slightly due to variations within the prescribed tolerance limitations for these elements. Therefore the linkage members employed in conventional riveting machines must compensate for varying clinching forces required. If too high a force is employed and no compensation is made for the distance of travel of the force applying means, rivets may be overclinched or peened and the work piece may be broken. Conversely, if too low a force is employed, the rivets will not be fully clinched or peened.

Various types of mechanical spring members such as helical springs or bellows are used in conventional riveting machines to support the rivet machine pilot or anvil on which the rivet is peened for compensating variations in the rivets and work pieces being peened or clinched. However, due to the physical characteristics of helical springs or bellows in this portion of the machine, several difficulties have been met in their use. This is particularly true due to the difficulty in obtaining a uniform load on each cycle which load is calculated for the spring rate of the spring used. For example, often the frequency of the spring used is not as fast as the action of the machine, and due to the inertia of the machine, double hits on the rivet and resulting marring of work pieces often occur. The inertia factor also tends to provide a delay to the machine action, frequently upsetting the timing of riveting machines. Moreover, compensating means in the form of metal helical springs introduced into the linkage system between the power source and rocking beam of conventional riveting machines are also unsatisfactory. If such a spring were to be used and were made strong enough for transmission of the desired load without deflection, it would not have a satisfactory deflection coefficient to permit deflection to a sufficient degree within the desired elastic range. On the other hand, if its diameter to length ratio were selected such that it would theoretically deflect within the desired range of applied force, it would not be suffiicently strong to avoid buckling. The absence of compensating means however is also undesirable as it has been found that a rejection rate of as much as 25% to 30% occurs in currently used constructions due to the problems indicated above.

Accordingly, it is an important object of this invention to provide a resiliently compressible linkage member for transmitting a preselected force over varying distances in machines such as riveting machines.

It is another object of this invention to provide a resiliently compressible linkage member which is relatively inexpensive and simple to manufacture.

It is a further object of this invention to provide a resiliently compressible member which transmits axially applied forces and prevents double hits, delayed return action and resulting timing upsets in machines such as riveting machines.

A further important object of this invention is to provide a means for clinching rivets with a positive force which is nonresilient or noncompensating within and up to a certain selected point of an applied force but which provides automatic compensation above such point.

Generally, the compressible linkage member of this invention comprises a first connection end portion, a second end portion, and a resiliently compressible intermediate portion axially aligned with and joining said first and second connection end portions. The first connection end preferably has a journal means with a greater sectional area, taken on a plane perpendicular to the axis of the linkage member than the cross sectional area of the compressible intermediate portion taken on a plane perpendicular to the axis of the linkage member. The linkage member is formed of a material such as nylon which is substantially noncompressible under pressures up to a critical value and resiliently compressible at pressures above said critical value to a preselected percentage of its length.

Numerous other features, objects and advantages of the invention will become apparent from the following specification when read in connection with the accompanying drawing in which:

FIG. 1 is a perspective view of a conventional riveting machine provided with a linkage member of the invention;

FIG. 2 is a simplified fragmentary view thereof showing a linkage assembly of the riveting machine;

FIG. 3 is a perspective view of a preferred embodiment of the linkage member of this invention;

FIG. 4 is a front view of the linkage member of FIG. 3;

FIG. 5 is a side view taken partially along line 5—5 of FIG. 4 showing parts of the linkage member in cross section; and, FIG. 6 is a top view thereof.

A preferred embodiment of the linkage member 20 of this invention is shown in combination with a conventional riveting machine designated generally at 10 in FIG. 1. The riveting machine 10 basically comprises a metal casting or mounting 15 having a drive motor 11 mounted on a lower portion of the casting. Mechanical power is transmitted to elements of the machine by means of a pulley 13 and drive belts 12 and 18. A hopper assembly 14 is provided for supplying rivets to a work piece when the work piece is fed into the machine. A conventional cam arrangement is provided within section 19 for intermittently applying an upwardly directed axially aligned force to an end of elongated linkage member 20. The member 20 is pivotally connected or journaled at one end to one end 41, which is preferably forked, of the rocking beam 21. The other end of the member 20 is threaded into section 19 and is secured therein by a lock nut 33. The force applied to the linkage member 20 is a constant force at a constant pressure; however, the force and distance of travel of a hammer 17 of the machine is variable.

The resilient linkage member 20 transmits axially applied forces to a pivotally connected forked end 41 of rocking beam 21. The beam 21 is pivotally mounted on a pin 23 of a forked bracket 22 which forms a fulcrum for the beam 21. The other end of the beam 21 is pivotally attached by means of pin 25 to a bar 24. The lower end of bar 24 has a hammer 17 secured for engaging applying pressure and clinching rivets placed between it and an anvil 16 fixedly mounted directly below the hammer. The beam 21 may be of a conventional design, preferably allowing both bar 24 and linkage member 20 to move only in vertical, parallel paths.

As can clearly be understood from FIG. 2, upwardly directed axial forces applied to linkage member 20 are transmitted to the bar 24 and subsequently to hammer 17 in an axial direction directly opposed to the direction of the force applied to linkage member 20. The force and distance of travel of bar 24 in relation to the force and distance of travel of end 41 of the lever may be partially predetermined by proper positioning of the fulcrum of the lever in accordance with known mechanical principle. If linkage member 20 is formed of an incompressible material, the force and distance of travel of bar 24 would be directly related only to the force and distance of travel of linkage member 20. However, it is necessary to compensate for varying tolerances employed in the work pieces to be riveted as well as variations in the size of the rivets to be clinched in the machine described. If a constant force and distance of travel is imparted to bar 24 and hammer 17 during consecutive cycles of the machine, certain rivets would be clinched or peened to too great a degree while other rivets would be loosely clinched or peened.

The resiliently compressible linkage member 20 of this invention compensates for the varying tolerances of the work pieces and rivets to be clinched in the riveting machine described above. As best shown in FIGS. 3–6, the linkage member 20 of this invention is composed of a preferably ring shaped first connection end 32 having an annular cutout portion or bore 60 centrally located and having an axis perpendicular to the axis of the linkage member 20. A steel or substantially rigid bushing or ferrule 30 is preferably positioned within the cutout portion of the first connection end 32 by means of a set screw 31. The substantially rigid hard bushing 30 tends to relieve forces on the bore 60 in the first connection end 32 and aids in preventing distortion of the first connection end. In some instances, it has been found desirable to knurl the outside of the bushing 30 and force fit the bushing within the hole in first connection end 32. This expedient aids in preventing turning of the bushing and tends to prevent stress overloading of points on the inner surface of the hole 60.

The intermediate portion of the linkage member preferably comprises a solid cylindrical shaft 36 formed of a resiliently compressible material as will be more fully described hereafter.

A second connection end 40 of the linkage member comprises a screw thread 35 on the outer surface of an end of solid shaft 36. An attachment or locking nut 33 having a set screw 34 therein is formed of the same material as shaft 36 and located on end 40. By moving nut 33 axially of the linkage the effective length of the intermediated portion 36 may be varied as desired. A bore is provided at 50 for connecting the linkage member 20 to an underlying surface.

The compressible linkage member 20 is preferably mounted in the machine by pivotally securing the first connection end 32 to end 41 of the lever on 21 by means of pin 42. The second connection end of the linkage member 20 is secured to a cam within housing 19 by screwing the end 40 into the housing, locating bore 50 against a mating projection on the cam and firmly tightening the nut 33 against housing 19.

The design and material employed in the linkage member of the present invention are selected so that the linkage member will transfer axially applied forces from connection end 40 directly to hammer 17, up to a given value. After the preselected given value is reached, the linkage member is elastically compressed a preselected distance to absorb excessive forces and thus prevent excessive clinching action of the hammer 17 and anvil 16 on the rivets of the work pieces employed.

Plastic materials such as polyethylene terephthalate, epoxy resins, polystyrene polymers and copolymers, and nylon materials may be employed for the linkage member of this invention. It is important that the material employed have a modulus of elasticity below about 30,000 p.s.i. and does not permit the shaft 36 to undergo axial deflection when subjected to clinching force. Synthetic linear superpolyamides such as, nylon 6, nylon 9, nylon 11, nylon 6, 6, have been found to be particularly suitable for employment in the present invention. These polyamides may be made by conventional polymerization such as the reaction of dicarboxylic acids with diamines, condensation of amino acids and the reaction of polymerized vegetable oil acids with polyamides.

In addition to the material employed, the relative proportions of the parts of the linkage member are significant. The diameter of the bore 30 and its length each should be at least as great or greater than the corresponding diameter of the intermediated portion 36. Thus, both the distance B, from front to rear of the first connection end 32, and the distance A, which is taken tangent to the bore 60 in the first connection end, and between lines drawn parallel to the axis of shaft 36, are greater than the diameter of the shaft 36. The shaft thereby has a smaller cross-sectional area than any other portion of the linkage member and acts as the primary resiliently or elastically compressible portion of the linkage member. In determining the amount of compressibility of the linkage member for any preselected pressure applied thereto, the compressibility of portions below point 80 (see FIG. 4) is of primary importance. The nut 33 is composed of the same material as the shaft 36, so that effectively when linkage member 20 is locked in position in a riveting machine, the significant compressible area of the linkage member extends from the bottom 82 of the nut 33 upwardly to the point 80 at the top of shaft 36.

The proportioning of the parts of the linkage member should be related to the modulus of elasticity of the material used. A modulus of elasticity below about 30,000 p.s.i. for linkage members useful in presently available riveting machines is required in order to permit sufficient compensation and at the same time adequate power transmission up to the desired value.

The total compression under load may be related to the parameters of the member 20 by the formula:

$$e = Pl/AE$$

where $e$ = total compression under load, in.
$P$ = total axial load, lb.
$l$ = total length of member 20, in.
$A$ = cross sectional area of member at 36, in.$^2$.
$E$ = modulus of elasticity, p.s.i.

Thus with a member of a given length and of a material having a modulus of elasticity, E, below 30,000 p.s.i. cross-sectional areas may be calculated readily to permit compressive compensation over a wide range of applied pressures in the machine.

In a preferred exemplification of the invention, I employed a nylon material such as nylon 6, 6 having a compression value such that when the linkage member is under 11,200 pounds per sq. inch of axial pressure there will be a one percent decrease in the length thereof. If in a machine of the preferred embodiment a compression of 800 pounds is desired and is to be transmitted to the hammer and anvil of the riveting machine, the cross-sectional area of intermediate portion 36 is so designed as to provide for compression at or above values of 800 pounds. Knowing the maximum pressure P desired to be transmitted to the hammer and anvil, and the modulus of elasticity E of the nylon material, the desired cross sectional area of intermediated member 36 can be calculated by dividing P by E. Thus in the preferred embodiment, when $P = 800$ pounds and $E = 11,200$ p.s.i., a cross sectional area of .0721 square inch is necessary for compression of 1% of the length of the member.

Since the intermediated portion has a circular configuration, it is simple to calculate by ordinary methods the diameter of the shaft 36, which is .312″. The .312″ diameter shaft will compress up to 1% of its length with compressive forces P in excess of 800 pounds per square inch. If, for example, the shaft is two inches long, there will be a give or compression of up to 0.02″ at or above 800 pounds per square inch pressure.

Assuming that pins 25 and 42 in this example are equally distant from fulcrum pin 23 on lever on 21, when an axial force of 800 pounds per square inch or greater is applied to the second connection end 40 of the linkage member 20, the hammer 24 will move downwardly and engage a rivet of a work piece inserted into the machine and apply a force of 800 pounds per square in to clinch the rivet. Any greater force will be taken up by the give or compression of the intermediated portion of 36 of the linkage member 20 which is elastically compressible to 0.02″. Thus, equal pressures of 800 pounds per square inch may be applied to successive rivets placed between anvil 16 and hammer 17, even though their dimensions may vary slightly as long as the variation is within 0.02″.

The length of the intermediated portion 36 of the linkage member 20 may be varied as desired depending upon the particular material employed, and the amount of takeup desired. If it is desired to compensate for a predetermined force over a 0.04″ range of travel of hammer 17, this may be accomplished by increasing the length of the intermediated portion 36 to 4″. It is only necessary to maintain the length of diameter ratio of the intermediate portion 36 so that there will be substantially no flexing of this portion under the pressures applied.

In designing the linkage member 20 compensation must be made for atmospheric temperature variations which affect the length of the intermediate portion 36. For example, the temperature coefficient of nylon is approximately .0001% per degree centigrade. The length of the shaft should be selected with regard to the working temperature of the machine taking into account length at varying temperatures. However, after the link is formed the effective length of the intermediate portion can be adjusted for temperature variation by raising or lowering of nut 34 and thus varying the effective length of the end 40 screwed into the metal mounting in the riveting machine.

While there has been described a specific embodiment of the invention many variations are possible. Thus, the specific shape of the linkage member may vary in specific applications. The shaft 36 may in fact be square, triangular or irregular in cross-section, although the calculation of the cross-sectional area may be made difficult when irregular shapes are used. The connection end portions may vary in shape and size depending on the type of members to be linked by the linkage member. If compressions higher than 1% of length are desired the cross-sectional area or applied force may be varied depending upon the particular material employed. Consequently the breadth of this invention is to be construed as limited only by the spirit and scope of the appended claims.

What is claimed is:

1. In a riveting machine having means for applying a clinching force to a rivet the improvement comprising, said clinching means including a resiliently compressible plastic linkage member for transmission of forces having a first connection end, a second connection end and an intermediate portion, said intermediate portion being substantially incompressible at pressures below a preset value and being elastically compressible at pressures above said value, said intermediate portion having parameters interrelated to its maximum compressibility by the formula:

$$e = Pl/AE$$

where:

$e$ = total compression under load, in.
$P$ = total axial load
$l$ = total length of said intermediate portion, in.
$A$ = cross sectional area of said intermediate portion in.$^2$.
$E$ = modulus of elasticity of said intermediate portion p.s.i.

2. The improvement of claim 1 wherein said intermediate portion is formed of nylon.

3. In a machine having means for transmitting intermittently applied force and comprising a lever supported at a fulcrum, a hammer operatively engaging one end of said lever and a linkage member operatively engaging a second end of said lever, said linkage member being formed of a plastic having a modulus of elasticity below 30,000 p.s.i. and having a first connection end, a second connection end and an elongated intermediate portion, said first connection end having a bore therethrough located perpendicular to said elongated intermediate portion, said second connection end having means thereon for varying the effective length of said intermediate portion, said intermediate portion having a circular cross-section and sized to transmit forces applied axially thereto up to a predetermined value and to be resiliently compressed above said predetermined value for a predetermined percentage of its length.

4. A machine in accordance with claim 3 wherein said linkage member is composed of nylon and said length varying means is a nut threaded on said second connection end and composed of nylon.

References Cited by the Examiner

UNITED STATES PATENTS

| | | | |
|---|---|---|---|
| 312,826 | 2/1885 | Deering | 72—431 |
| 873,649 | 12/1907 | Allen | 287—59 |
| 1,640,433 | 8/1927 | Weldon. | |
| 2,359,815 | 10/1944 | Wilcox | 10—23 |
| 2,919,942 | 1/1960 | Bechtel | 287—96 |

CHARLES W. LANHAM, Primary Examiner.

G. P. CROSBY, Assistant Examiner.